(12) United States Patent
Li et al.

(10) Patent No.: US 11,886,063 B2
(45) Date of Patent: Jan. 30, 2024

(54) DISPLAY PANEL MOTHERBOARD, CUTTING METHOD AND MANUFACTURING METHOD THEREOF, DISPLAY PANEL, AND DISPLAY DEVICE

(71) Applicant: BOE TECHNOLOGY GROUP CO., LTD., Beijing (CN)

(72) Inventors: Shulei Li, Beijing (CN); Hua Huang, Beijing (CN); Zhao Kang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 631 days.

(21) Appl. No.: 16/977,300

(22) PCT Filed: Nov. 29, 2019

(86) PCT No.: PCT/CN2019/122012
§ 371 (c)(1),
(2) Date: Sep. 1, 2020

(87) PCT Pub. No.: WO2021/102921
PCT Pub. Date: Jun. 3, 2021

(65) Prior Publication Data
US 2022/0382097 A1 Dec. 1, 2022

(51) Int. Cl.
*G02F 1/1333* (2006.01)
*G02F 1/1335* (2006.01)

(52) U.S. Cl.
CPC .. *G02F 1/133351* (2013.01); *G02F 1/133514* (2013.01)

(58) Field of Classification Search
CPC ......... G02F 1/133351; G02F 1/133342; G02F 1/133331; G02F 1/1347; G02F 1/1345;
(Continued)

(56) References Cited

U.S. PATENT DOCUMENTS 3,903,519 A * 9/1975 Zega ................. G02F 1/134327
40/448
2009/0027323 A1 1/2009 Choi
(Continued)

FOREIGN PATENT DOCUMENTS

CN 101276083 A 10/2008
CN 101354873 A 1/2009
(Continued)

OTHER PUBLICATIONS

Espacenet English machine translation of CN107742476A (Year: 2018).*
(Continued)

*Primary Examiner* — Edward J Glick
*Assistant Examiner* — David Y Chung
(74) *Attorney, Agent, or Firm* — Scully, Scott, Murphy & Presser, P.C.

(57) ABSTRACT

A display panel motherboard, a cutting method and a manufacturing method thereof, a display panel, and a display device are provided. The display panel motherboard includes at least three mother substrates, at least one display panel unit, and a cutting region. The at least three mother substrates are stacked with each other, at least a portion of the at least one display panel unit is surrounded by the cutting region, and an organic film layer is not disposed in at least two of the at least three mother substrates in the cutting region.

12 Claims, 7 Drawing Sheets

(58) Field of Classification Search
CPC ............ G02F 1/13452; G02F 1/13456; G02F 1/13458; G02F 1/13454
USPC .................................................. 349/74, 115
See application file for complete search history.

(56) References Cited

U.S. PATENT DOCUMENTS

2014/0017967 A1\* 1/2014 Kim .......................... H01J 9/00
                                                        445/25
2017/0326682 A1   11/2017 Park
2020/0096673 A1\*  3/2020 Wu ....................... G02F 1/1333
2021/0356781 A1\* 11/2021 Wang ................ G02F 1/133305

FOREIGN PATENT DOCUMENTS

| CN | 107742476 A | 2/2018 |
| CN | 208336226 U | 1/2019 |
| CN | 110058445 A | 7/2019 |

OTHER PUBLICATIONS

Espacenet English machine translation of CN101354873A (Year: 2009).\*

\* cited by examiner

DISPLAY PANEL MOTHERBOARD, CUTTING METHOD AND MANUFACTURING METHOD THEREOF, DISPLAY PANEL, AND DISPLAY DEVICE

CROSS-REFERENCE TO RELATED APPLICATIONS

This application is a national phase entry of PCT International Application No. PCT/CN2019/122012, filed on Nov. 29, 2019. The disclosure of PCT International Application No. PCT/CN2019/122012 is incorporated by reference herein.

TECHNICAL FIELD

Embodiments of the present disclosure relate to a display panel motherboard, a cutting method and a manufacturing method thereof, a display panel, and a display device.

BACKGROUND

With continuous development of display technology, users have put forward higher and higher requirements for the contrast, brightness uniformity, or the like of liquid crystal display devices. Currently, in order to better control the contrast between the bright state and the dark state of the display panel, a light control panel may be provided between the display panel and a backlight module of the liquid crystal display device. The light control panel can adjust a polarization direction, intensity, or the like of the backlight provided by the backlight module, and provide the adjusted backlight to the display panel for performing display operations.

SUMMARY

At least one embodiment of the present disclosure provides a display panel motherboard, the display panel motherboard comprises at least three mother substrates laminated with each other, at least one display panel unit and a cutting region, at least a portion of the at least one display panel unit is surrounded by the cutting region, and an organic film layer is not disposed in at least two of the at least three mother substrates in the cutting region.

For example, in the display panel motherboard provided by at least one embodiment of the present disclosure, in each of the at least one display panel unit, at least one of the at least three mother substrates comprises a bonding region; and on a mother substrate in which an organic film layer is not disposed in the cutting region and comprising the bonding region, the organic film layer is not disposed in the bonding region.

For example, in the display panel motherboard provided by at least one embodiment of the present disclosure, an inorganic film layer is not disposed in the cutting region of at least one of the at least three mother substrates.

At least one embodiment of the present disclosure provides a display panel, the display panel is obtained by cutting the display panel motherboard according to any one embodiment, the display panel comprises at least three substrates, each of the at least three substrates is obtained by cutting each of the at least three mother substrates, at least one of the at least three substrates comprises a bonding region, and one of the at least one display panel unit corresponds to the display panel.

For example, in the display panel provided by at least one embodiment of the present disclosure, on a side where the bonding region is located, orthographic projections of outer edges of the at least three substrates in a plane parallel to a main surface of the display panel do not overlap with each other.

For example, in the display panel provided by at least one embodiment of the present disclosure, on the side where the bonding region is located, the outer edges of the at least three substrates are in a stepped structure along a first direction, and the first direction is perpendicular to the main surface of the display panel.

For example, in the display panel provided by at least one embodiment of the present disclosure, on the side where the bonding region is located, among the orthographic projections of the outer edges of the at least three substrates in the plane parallel to the main surface of the display panel except for an outermost orthographic projection, a distance between adjacent orthographic projections is 3 mm to 4 mm.

For example, in the display panel provided by at least one embodiment of the present disclosure, on the side where the bonding region is located, among the orthographic projections of the outer edges of the at least three substrates in the plane parallel to the main surface of the display panel except for an outermost orthographic projection, a distance between adjacent orthographic projections is greater than or equal to ½ of a width of a cutting wheel used for cutting the display panel motherboard.

For example, in the display panel provided by at least one embodiment of the present disclosure, the at least three substrates comprise a first substrate, a second substrate, and a third substrate; the first substrate is on a side of the second substrate away from the third substrate; and on the side where the bonding region is located, an orthographic projection of an outer edge of the first substrate on the second substrate is on an inner side of an outer edge of the second substrate, and an orthographic projection of the outer edge of the second substrate on the third substrate is on an inner side of an outer edge of the third substrate.

For example, in the display panel provided by at least one embodiment of the present disclosure, on the side where the bonding region is located, a distance between the orthographic projection of the outer edge of the first substrate on the second substrate and the outer edge of the second substrate is 3 mm to 4 mm.

For example, in the display panel provided by at least one embodiment of the present disclosure, on the side where the bonding region is located, the distance between the orthographic projection of the outer edge of the first substrate on the second substrate and the outer edge of the second substrate is greater than or equal to ½ of a width of a cutting wheel used for cutting the display panel motherboard.

For example, the display panel provided by at least one embodiment of the present disclosure further comprises: a first liquid crystal layer, being between the first substrate and the second substrate; and a second liquid crystal layer, being between the second substrate and the third substrate, the second substrate is a common substrate, and a display array element is provided on a side of the common substrate facing the first substrate; the first substrate is a color filter substrate, and a color filter layer is provided on a side of the first substrate facing the common substrate; and the third substrate is a light control array substrate, and a light control array element is provided on a side of the third substrate facing the common substrate.

For example, in the display panel provided by at least one embodiment of the present disclosure, an inorganic film layer is not disposed in the bonding region of at least one of the at least three substrates.

For example, in the display panel provided by at least one embodiment of the present disclosure, each of the at least three substrates further comprises an encapsulation region; in a substrate comprising the bonding region, at least a portion of the encapsulation region is surrounded by the bonding region; and on a side where the bonding region is located, a gap is provided between an outer edge of each of the at least three substrates and the bonding region, or between the outer edge of each of the at least three substrates and the encapsulation region.

At least one embodiment of the present disclosure provides a cutting method of the display panel motherboard according to any one embodiment, the cutting method comprises cutting the display panel motherboard along at least one cutting line in the cutting region to form at least one display panel, and the display panel corresponds to the display panel unit.

For example, in the cutting method provided by at least one embodiment of the present disclosure, the cutting the display panel motherboard along the at least one cutting line in the cutting region to form the at least one display panel comprises: cutting the display panel motherboard with an energy cutting beam along a first cutting line in the cutting region, to allow at least one portion to be processed to be separated from the display panel motherboard, and each of the at least one portion to be processed comprises one display panel unit.

For example, in the cutting method provided by at least one embodiment of the present disclosure, the energy cutting beam comprises a laser, an electron beam, or an ion beam.

For example, in the cutting method provided by at least one embodiment of the present disclosure, the cutting the display panel motherboard along the at least one cutting line in the cutting region to form the at least one display panel further comprises: mechanically cutting at least one mother substrate of the portion to be processed along a second cutting line to form the display panel on a side of the portion to be processed where the bonding region is located.

For example, in the cutting method provided by at least one embodiment of the present disclosure, the second cutting line includes at least two sub-cutting lines, and in a plane parallel to a main surface of the display panel motherboard, a distance between two adjacent sub-cutting lines of the at least two sub-cutting lines is 3 mm to 4 mm.

For example, in the cutting method provided by at least one embodiment of the present disclosure, the mechanically cutting comprises cutting with a cutting wheel; the second cutting line comprises at least two sub-cutting lines; and in a plane parallel to a main surface of the display panel motherboard, a distance between two adjacent sub-cutting lines of the at least two sub-cutting lines is greater than or equal to ½ of a width of the cutting wheel.

For example, in the cutting method provided by at least one embodiment of the present disclosure, the at least three mother substrates comprise a first mother substrate, a second mother substrate, and a third mother substrate, and the mechanically cutting the at least one mother substrate of the portion to be processed along the second cutting line to form the display panel comprises: mechanically cutting a first mother substrate of the portion to be processed along a first sub-cutting line to form a first substrate of the display panel and mechanically cutting a second mother substrate of the portion to be processed along a second sub-cutting line to form a second substrate of the display panel, and the first sub-cutting line is on a side of the second sub-cutting line away from the first cutting line.

At least one embodiment of the present disclosure provides a manufacturing method of a display panel motherboard, the manufacturing method comprises: forming a display panel motherboard comprising at least one display panel unit, and the display panel motherboard comprises at least three mother substrates stacked with each other, the at least one display panel unit and a cutting region; at least a portion of the at least one display panel unit is surrounded by the cutting region, an organic film layer is not disposed in at least two of the at least three mother substrates in the cutting region; and the forming the display panel motherboard comprising the at least one display panel unit comprises: forming each of the at least three mother substrates, respectively, and assembling the at least three mother substrates to form the display panel motherboard, and a step of forming the each of the at least three mother substrates, respectively, comprises: etching and removing organic film layers of the at least two of the at least three mother substrates in the cutting region.

For example, in the manufacturing method provided by at least one embodiment of the present disclosure, in each of the at least one display panel unit, at least one of the at least three mother substrates comprises a bonding region; on a mother substrate in which an organic film layer is not disposed in the cutting region and comprising the bonding region, the organic film layer is not disposed in the bonding region; and the step of forming the each of the at least three mother substrates respectively further comprises etching and removing the organic film layer in the bonding region of the mother substrate in which an organic film layer is not disposed in the cutting region and comprising the bonding region.

At least one embodiment of the present disclosure provides a display device, the display device comprises the display panel according to any one embodiment.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
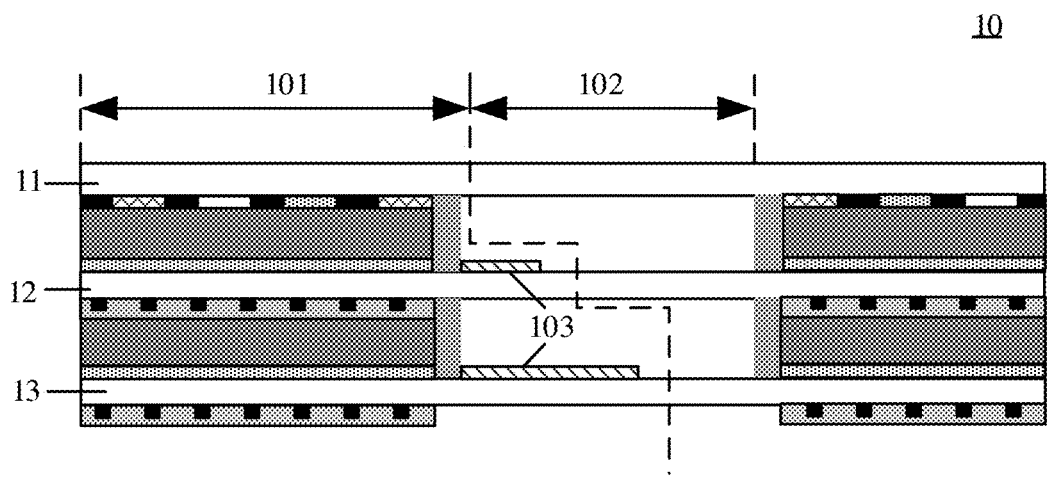
FIG. 1 is a schematic diagram of a partial cross-sectional structure of a display panel motherboard provided by some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the number, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects.

At present, by providing a light control panel between a display panel and a backlight module of a liquid crystal display device, the brightness of the backlight provided to the display panel can be controlled according to regions. For example, the display panel is usually a liquid crystal display panel, and the light control panel is usually a light control liquid crystal panel. By adjusting deflection angles of liquid crystal molecules in a liquid crystal layer of the light control liquid crystal panel, the brightness of the backlight provided to the liquid crystal display panel can be adjusted. For example, by adjusting the deflection angles of the liquid crystal molecules in the light control liquid crystal panel, the brightness of the backlight provided to a portion of the liquid crystal display panel corresponding to a dark state region of the display image can be reduced, so as to reduce the intensity of light transmitted through the dark state region of the display image, thereby avoiding or attenuating the light leakage phenomenon of the liquid crystal display device in the dark state.

Generally, the above-mentioned liquid crystal display device includes at least three substrates laminated with each other. For example, each of the liquid crystal display panel and the light control liquid crystal panel may include two substrates opposite to each other, thereby forming a liquid crystal display device with a structure including four substrates. Alternatively, one substrate in the liquid crystal display panel and one substrate in the light control liquid crystal panel may be set as a common substrate, and the liquid crystal display panel and the light control liquid crystal panel share the common substrate, thereby forming a liquid crystal display device with a structure including three substrates. Alternatively, the above-mentioned liquid crystal display device may also include more than four substrates depending on functional requirements.

In the process of manufacturing the liquid crystal display device including three or more substrates, it is usually necessary to cut the display panel motherboard including three or more substrates to obtain the liquid crystal display device. However, conventional mechanical cutting methods, such as cutting with a cutting wheel, can only cut one substrate at a time, which is difficult to simultaneously cut three substrates from the display panel motherboard. For example, when the cutting wheel is used to cut the display panel motherboard including three or more substrates, a cutting region of a substrate in a first layer needs to be first removed through a plurality of cuttings, e.g., two cuttings, so as to expose a cutting region of an internal substrate. However, cracks produced by the cutting wheel are uneven cracks, and the cutting region of the substrate in the first layer is usually difficult to be separated from the substrate in the first layer after the plurality of cuttings with the cutting wheel. For example, the cutting region of the substrate in the first layer needs to be manually separated from the substrate in the first layer by using a blade or the like. When the cutting region is manually separated, the uneven cracks produced by the cutting wheel may easily cause the surface of the substrate to break, and further cause damage to an edge of the substrate, which is difficult to achieve the cutting effect required in actual production and application.

In addition, a plurality of organic film layers or inorganic film layers need to be prepared on a substrate of the liquid crystal display device to achieve the display and light control functions. When cutting the display panel motherboard including three or more substrates, the plurality of organic film layers or inorganic film layers need to be cut at the same time, thus further increasing the difficulty of separating a part to be processed, which includes three or more substrates, from a preparation motherboard. For example, if a laser is used to cut three substrates at the same time, because the refractive index of the organic film layer and the refractive index of the inorganic film layer are usually different from the refractive index of the substrate, and there is often a large difference between the refractive index of the organic film layer and the refractive index of the substrate, when the laser beam passes through the organic film layer or the inorganic film layer, a direction of an optical path may have changed many times, which is difficult for the laser to focus to form a cutting wire (e.g., a focus wire) required for cutting the film layer, so that it is difficult to use an energy cutting beam, such as the laser beam, to cut three or more substrates at the same time.

In the display panel motherboard provided by the embodiments of the present disclosure, by reducing the number of organic film layers in the cutting region, adverse effect of the organic film layer on cutting, such as cutting with the energy beam, may be reduced when three or more mother substrates are simultaneously cut, thereby facilitating simultaneous cutting of three or more mother substrates in the display panel motherboard by using the energy beam, improving the cutting accuracy of the display panel motherboard, and improving the cutting effect of the display panel motherboard, so as to improve the yield of the display panel prepared from the display panel motherboard.

The display panel motherboard provided by the embodiments of the present disclosure may include three or more mother substrates, and accordingly, the display panel obtained by cutting the display panel motherboard provided by the embodiments of the present disclosure may include three or more substrates. Hereinafter, the embodiments of the present disclosure take a display panel motherboard including three mother substrates and a corresponding display panel including three substrates as an example to describe structures, functions, or the like of the display panel motherboard and the display panel provided by the embodiments of the present disclosure. It should be noted that the embodiments of the present disclosure include but are not limited to this.

Hereinafter, some embodiments of the present disclosure are described in detail with reference to the accompany drawings. It should be noted that the same reference numerals in different drawings are used to refer to the same described elements.

At least one embodiment of the present disclosure provides a display panel motherboard, and the display panel motherboard includes at least three mother substrates, at least one display panel unit, and a cutting region. The at least three mother substrates are laminated with each other, at least a portion of the at least one display panel unit is surrounded by the cutting region, and at least two of the at least three mother substrates are not provided with an organic film layer in the cutting region.

For example, in each of the at least one display panel unit, at least one of the at least three mother substrates includes a bonding region; and on a mother substrate being not provided with an organic film layer in the cutting region and including the bonding region, the organic film layer is not disposed in the bonding region.

For example, in the cutting region, at least one of the at least three mother substrates is not provided with an inorganic film layer.

FIG. 1 is a schematic diagram of a partial cross-sectional structure of a display panel motherboard provided by some embodiments of the present disclosure. Three mother substrates are illustrated in FIG. 1, which is only an example for description. The embodiments of the present disclosure may also include more than three mother substrates, and the structures of the more than three mother substrates depend on specific functional requirements, but the arrangements and functions of the cutting region, the bonding region, and the like are basically the same as or similar to those of the three mother substrates in the embodiments illustrated in FIG. 1.

For example, as illustrated in FIG. 1, the display panel motherboard 10 includes three mother substrates, at least one display panel unit 101, and a cutting region 102. The three mother substrates include a first mother substrate 11, a second mother substrate 12, and a third mother substrate 13. The first mother substrate 11, the second mother substrate 12, and the third mother substrate 13 are stacked with each other, and the third mother substrate 13 is located on a side of the second mother substrate 12 away from the first mother substrate 11. The cutting region 102 at least partially surrounds the at least one display panel unit 101. In the cutting region 102, at least two of the first mother substrate 11, the second mother substrate 12, and the third mother substrate 13 are not provided with organic film layers. For example, in the embodiment illustrated in FIG. 1, each of the first mother substrate 11, the second mother substrate 12, and the third mother substrate 13 is not provided with an organic film layer.

Therefore, when the cutting region 102 of the display panel motherboard 10 being cut, such as an energy cutting beam (for example, a laser, an electron beam, or an ion beam) is used to simultaneously cut the first mother substrate 11, the second mother substrate 12, and the third mother substrate 13 to separate the display panel unit 101 from the display panel motherboard, and because each of the first mother substrate 11, the second mother substrate 12, and the third mother substrate 13 is not provided with the organic film layer in the cutting region, taking the laser as an example, a direction of an optical path of the laser may substantially not change. Therefore, in the process of using the laser to cut the display panel motherboard 10, the beam can be focused to form the cutting wire required for cutting the film layer, so as to achieve the simultaneous cutting of the first mother substrate 11, the second mother substrate 12, and the third mother substrate 13. Therefore, adverse effect of the organic film layer on the cutting process of the display panel motherboard 10 can be effectively avoided, thereby improving the cutting accuracy of the display panel motherboard 10, improving the cutting effect of the display panel motherboard 10, and further improving the yield of the display panel prepared from the display panel motherboard 10.

It should be noted that in the embodiment illustrated in FIG. 1, in the cutting region 102, each of the first mother substrate 11, the second mother substrate 12, and the third mother substrate 13 is not provided with the organic film layer; and in some other embodiments of the present disclosure, in the cutting region 102, one of the first mother substrate 11, the second mother substrate 12, and the third mother substrate 13 may also be provided with the organic film layer. In this case, because only one of the first mother substrate 11, the second mother substrate 12, and the third mother substrate 13 is provided with the organic film layer in the cutting region 102, the beam direction may not change greatly when the display panel motherboard 10 is cut with such as the laser, so that the laser can focus to form the cutting wire required for cutting the film layer during the process of cutting the display panel motherboard 10, thereby facilitating achieving the simultaneous cutting of the first mother substrate 11, the second mother substrate 12, and the third mother substrate 13 in the display panel motherboard 10, and attenuating the adverse effect of the organic film layer on the cutting process of the display panel motherboard 10. In addition, in this case, the organic film layer of one mother substrate in the cutting region 102 does not need to be etched and removed, and therefore, in the manufacturing process of the mother substrate, the corresponding process of etching the organic film layer can be omitted, thereby simplifying the manufacturing process of the display panel motherboard 10 and reducing the manufacturing cost of the display panel motherboard 10.

For example, as illustrated in FIG. 1, in the cutting region 102, none of the first mother substrate 11, the second mother substrate 12, and the third mother substrate 13 is provided with an inorganic film layer, that is, in the embodiment illustrated in FIG. 1, none of the first mother substrate 11, the second mother substrate 12, and the third mother substrate 13 is provided with the organic film layer and the inorganic film layer in the cutting region 102. Thus, when the cutting region 102 of the display panel motherboard 10 being cut, the adverse effect of the inorganic film layer on such as the direction of the optical path of the laser may further be avoided, so that the laser can be focused to form the cutting wire required for cutting the film layer during the cutting process of the display panel motherboard 10, thereby achieving simultaneous cutting of the first mother substrate 11, the second mother substrate 12, and the third mother substrate 13.

It should be noted that, the difference between the refractive index of the inorganic film layer and the refractive index of the first mother substrate 11, the second mother substrate 12, or the third mother substrate 13 is relatively small, and therefore, in some other embodiments of the present disclosure, the first mother substrate 11, the second mother substrate 12, and the third mother substrate 13 may also be provided with inorganic film layers in the cutting region 102. Thus, in the manufacturing process of the display panel motherboard 10, the process of etching and removing the inorganic film layer in the cutting region 102 on the mother substrate can be omitted, thereby simplifying the manufacturing process of the display panel motherboard 10 and reducing the manufacturing cost of the display panel motherboard 10.

For example, as illustrated in FIG. 1, the second mother substrate 12 and the third mother substrate 13 further include bonding regions 103. Each of the bonding region 103 of the second mother substrate 12 and the bonding region 103 of the third mother substrate 13 is not provided with an organic film layer, that is, neither of the second mother substrate 12 and the third mother substrate 13 is provided with the organic film layer in the bonding region 103 and the cutting region 102. Because neither the second mother substrate 12 nor the third mother substrate 13 is provided with the organic film layer in the cutting region 102, it is necessary to use, for example, a masking process to etch and remove the organic film layer in the cutting region 102 during the manufacturing process of the display panel motherboard 10. In this case, the organic film layer in the bonding region 103 is simultaneously etched and removed, which may reduce the requirements of the process accuracy for etching and removing the organic film layers on the second mother substrate 102 and the third mother substrate 103 and facilitate operating, thereby simplifying the manufacturing process of the second mother substrate 102 and the third mother substrate 103, and reducing the manufacturing cost of the second mother substrate 102 and the third mother substrate 103.

For example, as illustrated in FIG. 1, neither the bonding region 103 of the second mother substrate 12 nor the bonding region 103 of the third mother substrate 13 is provided with an inorganic film layer, that is, in the embodiment illustrated in FIG. 1, neither the second mother substrate 12 nor the third mother substrate 13 is provided with the organic film layer and the inorganic film layer in the bonding region 103. Therefore, the process accuracy requirements which need to be achieved when the inorganic film layers on the second mother substrate 12 and the third mother substrate 13 are etched and removed may be reduced, which may facilitate operations, thereby simplifying the manufacturing process of the second mother substrate 102 and the third mother substrate 103, and reducing the manufacturing cost of the second mother substrate 102 and the third mother substrate 103.

It should be noted that in some other embodiments of the present disclosure, the bonding region 103 does not need to be cut in the cutting process of the display panel motherboard 10, and therefore, the second mother substrate 12 and the third mother substrate 13 may be provided with the organic film layer or the inorganic film layer in the bonding region 103, which is not limited in the embodiments of the present disclosure.

It should be noted that, in the embodiment illustrated in FIG. 1, the bonding regions 103 are disposed on the second mother substrate 12 and the third mother substrate 13. In other embodiments of the present disclosure, according to different actual requirements, a bonding region 103 may be disposed on the first mother substrate 11. For example, the first mother substrate 11 and the third mother substrate 13 may be provided with bonding regions 103, or three mother substrates are all provided with bonding regions 103, and the embodiments of the present disclosure do not limit the location of the bonding region 103.

For example, the display panel unit 101 of the display panel motherboard 10 illustrated in FIG. 1 is configured to implement a display panel. The structure, function, and the like of the display panel unit 101 may be with reference to the corresponding descriptions of the display panel provided in some embodiments of the present disclosure below.

FIG. 1 shows a case where the display panel motherboard includes three mother substrates, but it is only an example. The embodiments of the present disclosure may also include more than three mother substrates, and the structure may depend on specific functional requirements. In the case where the display panel motherboard includes more than three mother substrates, the arrangements and functions of the cutting region and the bonding region are basically the same as or similar to those of the three mother substrates in the embodiment illustrated in FIG. 1.

In some embodiments, the display panel motherboard may further include four or more than four mother substrates.

Figure 2:
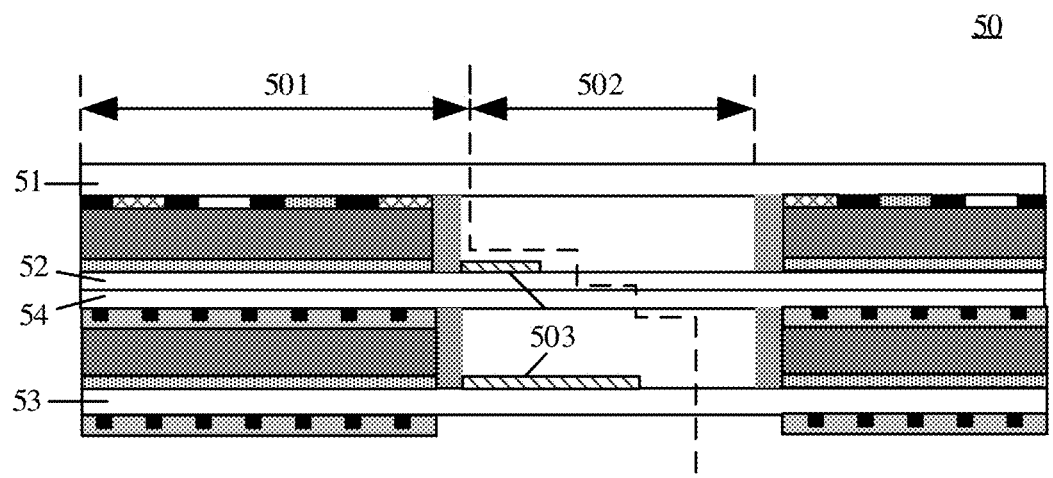
FIG. 2 is a schematic diagram of a partial cross-sectional structure of another display panel motherboard provided by some embodiments of the present disclosure.

FIG. 2 is a schematic diagram of a partial cross-sectional structure of another display panel motherboard provided by some embodiments of the present disclosure. It should be noted that, except for the fourth mother substrate 54, other structures of the display panel motherboard 50 illustrated in FIG. 2 are basically the same as or similar to those of the display panel motherboard 10 illustrated in FIG. 1, and details are not described herein again.

For example, as illustrated in FIG. 2, the display panel motherboard 50 includes a first mother substrate 51, a second mother substrate 52, a third mother substrate 53, and a fourth mother substrate 54. The first mother substrate 51, the second mother substrate 52, the third mother substrate 53, and the fourth mother substrate 54 are stacked with each other, and the fourth mother substrate 54 is provided between the second mother substrate 52 and the third mother substrate 53. The display panel motherboard 50 includes at least one display panel unit 501 and a cutting region 502 surrounding at least a portion of the at least one display panel unit 501. In the cutting region 502, at least three of the first mother substrate 51, the second mother substrate 52, the third mother substrate 53, and the fourth mother substrate 54 are not provided with organic film layers, and for example, as illustrated in FIG. 2, none of the first mother substrate 51, the second mother substrate 52, the third mother substrate 53, and the fourth mother substrate 54 is provided with the organic film layer. Therefore, the adverse effect of the organic film layer on the cutting process of the display panel motherboard 50 can be effectively avoided, improving the cutting accuracy of the display panel motherboard 50, and improving the cutting effect of the display panel motherboard 50, thereby improving the yield of the display panel prepared from the display panel motherboard 50.

It should be noted that, in some other embodiments of the present disclosure, in the cutting region 502, one of the first mother substrate 51, the second mother substrate 52, the third mother substrate 53, and the fourth mother substrate 54 may also be provided with an organic film layer. It should be noted that in the case where there is only one mother substrate provided with the organic film layer in the cutting region, the embodiments of the present disclosure do not limit the specific position of that mother substrate. For example, any one of the first mother substrate 51, the second mother substrate 52, the third mother substrate 53, and the fourth mother substrate 54 may be provided with the organic film layer in the cutting region 502.

For example, as illustrated in FIG. 2, in the cutting region 502, none of the first mother substrate 51, the second mother substrate 52, the third mother substrate 53, and the fourth mother substrate 54 is provided with an inorganic film layer, that is, in the embodiment illustrated in FIG. 2, none of the first mother substrate 51, the second mother substrate 52, the third mother substrate 53, and the fourth mother substrate 54 is provided with the organic film layer and the inorganic film layer in the cutting region 502. Therefore, when the cutting region 502 of the display panel motherboard 50 being cut, the adverse effect of the inorganic film layer on the direction of the optical path of such as the laser may be further avoided, and the laser can be focused to form the cutting wire required for cutting the film layer during the cutting process of the display panel motherboard 50, so that the first mother substrate 51, the second mother substrate 52, the third mother substrate 53, and the fourth mother substrate 54 can be cut at the same time.

For example, in some other embodiments of the present disclosure, in the cutting region 502, at least one of the first mother substrate 51, the second mother substrate 52, the third mother substrate 53, and the fourth mother substrate 54 may be provided with the inorganic film layer, and for example, all the mother substrates may be provided with inorganic film layers. The embodiments of the present disclosure are not limited in this aspect.

For example, as illustrated in FIG. 2, the second mother substrate 52 and the third mother substrate 53 further include bonding regions 503. The bonding region 503 of the second mother substrate 52 and the bonding region 503 of the third mother substrate 53 are not provided with organic film layers or inorganic film layers, that is, neither the second mother substrate 52 nor the third mother substrate 53 is provided with the organic film layer or the inorganic film layer in the bonding region 503 and the cutting region 502.

In some other embodiments of the present disclosure, according to different actual needs, the fourth mother substrate 54 may also be provided with a bonding region 503, and the embodiments of the present disclosure do not limit the location of the bonding region 503.

In some embodiments, in the case where the display panel motherboard includes more than four mother substrates, for example, in the case where the display panel motherboard includes N (N>4) mother substrates, the N mother substrates are stacked with each other. In the cutting region, N−1 of the N mother substrates are not provided with organic film layers, that is, at most only one of the N mother substrates is provided with an organic film layer in the cutting region. It should be noted that, in the case where only one mother substrate is provided with the organic film layer in the cutting region, the embodiments of the present disclosure do not limit the specific position of the mother substrate provided with the organic film layer in the cutting region.

For example, in the case where the display panel motherboard includes more than four mother substrates described above, the arrangement of the organic film layer or the inorganic film layer in the cutting region and the bonding region may refer to the corresponding descriptions in the embodiment of the display panel motherboard 10 illustrated in FIG. 1 or the embodiment of the display panel motherboard 50 illustrated in FIG. 2, and details are not described herein again.

At least one embodiment of the present disclosure further provides a display panel, and the display panel is obtained by cutting the display panel motherboard described above. The display panel includes at least three substrates, and each of the at least three substrates is obtained by cutting each of the at least three mother substrates of the display panel motherboard. At least one of the at least three substrates includes a bonding region, and one of the at least one display panel unit of the display panel motherboard corresponds to the display panel.

Figure 3:
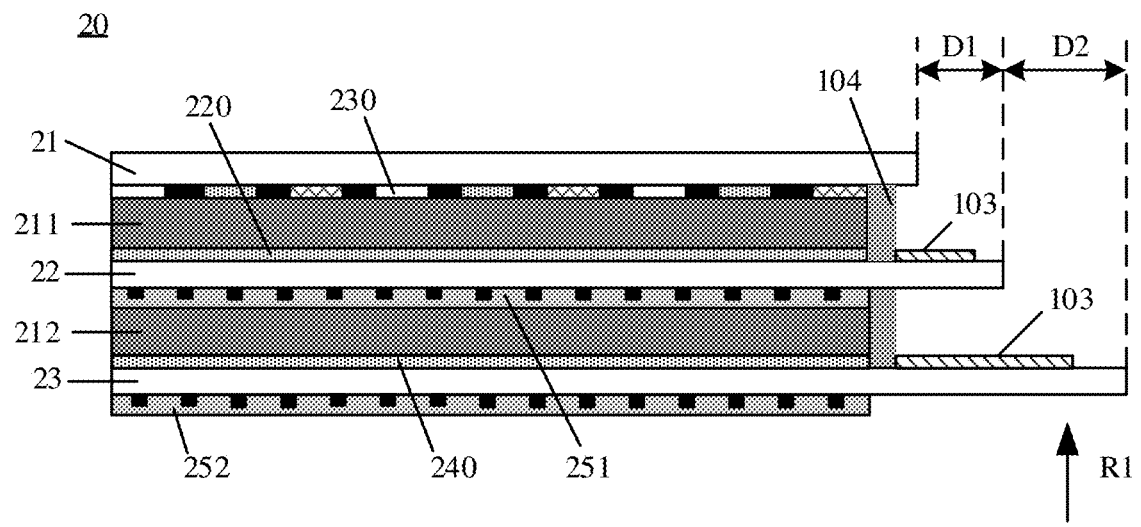
FIG. 3 is a schematic diagram of a partial cross-sectional structure of a display panel provided by some embodiments of the present disclosure.

FIG. 3 is a schematic diagram of a partial cross-sectional structure of a display panel provided by some embodiments of the present disclosure. For example, the display panel 20 illustrated in FIG. 3 may be obtained by cutting the display panel motherboard 10 illustrated in FIG. 1.

For example, as illustrated in FIG. 3, the display panel 20 may include a first substrate 21, a second substrate 22, and a third substrate 23. Each of the first substrate 21, the second substrate 22, and the third substrate 23 is obtained by cutting each of the first mother substrate 11, the second mother substrate 12, and the third mother substrate 13. For example, the first substrate 21 is obtained by cutting the first mother substrate 11 of the display panel motherboard 10 illustrated in FIG. 1, the second substrate 22 is obtained by cutting the second mother substrate 12 of the display panel motherboard 10 illustrated in FIG. 1, and the third substrate 23 is obtained by cutting the third mother substrate 13 of the display panel motherboard 10 illustrated in FIG. 1. For example, one of the at least one display panel unit 101 illustrated in FIG. 1 corresponds to the display panel 20, and at least one of the first substrate 21, the second substrate 22, and the third substrate 23 includes the bonding region 103. For example, as illustrated in FIG. 3, the second substrate 22 and the third substrate 23 include bonding regions 103.

In some embodiments, on a side where the bonding region is located, orthographic projections of outer edges of the at least three substrates in a plane parallel to a main surface of the display panel do not overlap with each other.

It should be noted that in the embodiments of the present disclosure, the main surface of the display panel refers to a display surface of the display panel, that is, a surface of the display panel close to a display side. For example, an arrangement direction of the at least three substrates is perpendicular to the main surface of the display panel. For example, in the embodiment illustrated in FIG. 3, a first direction R1 is perpendicular to the main surface of the display panel 20.

For example, as illustrated in FIG. 3, on the side where the bonding region 103 is located, the orthographic projections of the first substrate 21, the second substrate 22, and the third substrate 23 in the plane parallel to the main surface of the display panel 20 do not coincide, that is, on the side where the bonding region 103 is located, the outer edges of the first substrate 21, the second substrate 22, and the third substrate 23 are not aligned, thereby facilitating the bonding process.

In some embodiments, on the side where the bonding region is located, the outer edges of the at least three substrates have a stepped structure along the first direction, and the first direction is perpendicular to the main surface of the display panel.

For example, as illustrated in FIG. 3, on the side where the bonding region 103 is located, the outer edges of the first substrate 21, the second substrate 22, and the third substrate 23 form a stepped structure along the first direction R1. For example, the first direction R1 is perpendicular to the main surface of the display panel 20. For example, in the embodiment illustrated in FIG. 3, the first direction R1 is a direction toward the display surface of the display panel 20. In some other embodiments of the present disclosure, the first direction R1 may also be a direction away from the display surface of the display panel 20, and the embodiments of the present disclosure are not limited in this aspect.

For example, as illustrated in FIG. 3, on the side where the bonding region 103 is located, an orthographic projection of the outer edge of the first substrate 21 on the second substrate 22 is located inside of the outer edge of the second substrate 22, and an orthographic projection of the outer edge of the second substrate 22 on the third substrate 23 is located inside of the outer edge of the third substrate 23, so as to form the stepped structure along the first direction R1.

It should be noted that the embodiments of the present disclosure do not limit an extending direction of the stepped structure formed by the outer edges of the first substrate 21, the second substrate 22, and the third substrate 23. For example, in some other embodiments of the present disclosure, the orthographic projection of the outer edge of the third substrate 23 on the second substrate 22 may be located inside of the outer edge of the second substrate 22, and the orthographic projection of the outer edge of the second substrate 22 on the first substrate 21 may be located inside of the outer edge of the first substrate 21, which is not limited in the embodiments of the present disclosure.

It should be noted that the embodiment illustrated in FIG. 3 only takes the stepped structure formed by the outer edges of the first substrate 21, the second substrate 22, and the third substrate 23 as an example for description, and in some other embodiments of the present disclosure, the outer edges of the first substrate 21, the second substrate 22, and the third substrate 23 may also form other structures. For example, in some other embodiments of the present disclosure, the orthographic projection of the outer edge of the first substrate 21 on the second substrate 22 is located on an inner side of the outer edge of the second substrate 22, and the orthographic projection of the outer edge of the third substrate 23 on the second substrate 22 is located on an inner side of the outer edge of the second substrate 22, which may also facilitate the bonding process. The embodiments of the present disclosure are not limited in this aspect. For example, in some other embodiments of the present disclosure, the orthographic projection of the outer edge of the first substrate 21 on the third substrate 23 may coincide with or slightly deviate from the orthographic projection of the outer edge of the second substrate 22 on the third substrate 23.

It should be noted that in the embodiment illustrated in FIG. 3, the display panel 20 includes the first substrate 21, the second substrate 22, and the third substrate 23. While in some other embodiments of the present disclosure, according to actual requirements, the display panel 20 may further include a fourth substrate or more substrates, and the embodiments of the present disclosure are not limited in this aspect.

For example, for the display panel including four or more substrates, the outer edges of the substrates on the side where the bonding region is located may be in a stepped shape in a direction perpendicular to the main surface of the display panel. For example, the stepped shape may refer to the stepped structure formed by the first substrate 21, the second substrate 22, and the third substrate 23 in FIG. 3.

For example, for the display panel including four or more substrates, among the outer edges of the substrates on the side where the bonding region is located, the outer edge of the substrate in the middle may be on the outer side of the outer edge of the substrate on the outside. For example, when the display panel includes four substrates, the outer edges of the two substrates in the middle are on the outer side of the outer edges of the two substrates on the outside. In the direction perpendicular to the main surface of the display panel, the outer edges of the two substrates in the middle may coincide with or slightly deviate from each other, and the outer edges of the two substrates on the outside may coincide with or slightly deviate from each other. For example, when the display panel includes five substrates, the outer edges of the three substrates in the middle are on the outer side of the outer edges of the two substrates on the outside. The embodiments of the present disclosure are not limited in this aspect.

It should be noted that, for a non-bonding side of the display panel, the outer edges of the substrates may be arranged in a required manner according to actual requirements. For example, on the non-bonding side of the display panel, the outer edges of the substrates may be arranged to coincide with each other in the direction perpendicular to the main surface of the display panel. Alternatively, if an additional external component needs to be connected, the outer edge of the substrate connected to the external component may slightly protrude compared with the outer edges of other substrates. The embodiments of the present disclosure are not limited in this aspect.

In some embodiments, on the side where the bonding region is located, among the orthographic projections of the outer edges of the at least three substrates in the plane parallel to the main surface of the display panel except for an outermost orthographic projection, a distance between adjacent orthographic projections is 3 mm to 4 mm.

For example, as illustrated in FIG. 3, on the side where the bonding region 103 is located, a distance D1 between the orthographic projection of the outer edge of the first substrate 21 on the second substrate 22 and the outer edge of the second substrate 22 may be 3 mm to 4 mm.

For example, as illustrated in FIG. 3, on the side where the bonding region 103 is located, a distance D2 between the orthographic projection of the outer edge of the second substrate 22 on the third substrate 23 and the outer edge of the third substrate 23 may be 2 mm to 3 mm.

In some embodiments, in the process of cutting the display panel motherboard 10 illustrated in FIG. 1 to obtain the display panel 20 illustrated in FIG. 3, after the first mother substrate 11, the second mother substrate 12, and the third mother substrate 13 are cut at the same time with such as an energy cutting beam, the first mother substrate 11 and the second mother substrate 12 may be cut by a mechanical cutting method (such as cutting with a cutting wheel) to allow the first substrate 21, the second substrate 22, and the third substrate 23 to form the stepped structure on the side where the bonding region 103 is located.

In some embodiments, on the side where the bonding region is located, among the orthographic projections of the outer edges of the at least three substrates in the plane parallel to the main surface of the display panel except for an outermost orthographic projection, a distance between adjacent orthographic projections is greater than or equal to ½ of a width of a cutting wheel used for cutting the display panel motherboard.

For example, as illustrated in FIG. 3, on the side where the bonding region 103 is located, the distance D1 between the orthographic projection of the outer edge of the first substrate 21 on the second substrate 22 and the outer edge of the second substrate 22 is greater than or equal to, that is, not less than, ½ of the width of the cutting wheel used for cutting the display panel motherboard 10. Therefore, in the case where the first mother substrate 11 and the second mother substrate 12 are respectively cut with the cutting wheel to allow the first substrate 21, the second substrate 22, and the third substrate 23 to be in the stepped structure on the side where the bonding region 103 is located, it can be ensured that enough processing space is left, so that the cutting wheel can cut smoothly to form the stepped structure of the display panel 20 illustrated in FIG. 3.

For example, as illustrated in FIG. 3, the first substrate 21, the second substrate 22, and the third substrate 23 further include an encapsulation region 104. For example, in the second substrate 22 and the third substrate 23, the bonding region 103 surrounds at least a portion of the encapsulation region 104. On the side where the bonding region 103 is located, there are a gap between the outer edge of the first substrate 21 and the encapsulation region 104, a gap between the outer edge of the second substrate 22 and the bonding region 103, and a gap between the outer edge of the third substrate 23 and the bonding region 103. Thus, in the case where the first mother substrate 11, the second mother substrate 12, and the third mother substrate 13 of the display panel motherboard 10 illustrated in FIG. 1 are cut at the same time by using the energy cutting beam to allow the first substrate 21, the second substrate 22, and the third substrate 23 of the display panel 20 to be separated from the display panel motherboard 10, or in the case where the first substrate 21 and the second substrate 22 are cut by the mechanical cutting method (such as cutting with the cutting wheel) to allow the first substrate 21, the second substrate 22, and the third substrate 23 to be in the stepped structure on the side where the bonding region 103 is located, sufficient cutting margins can be left, thereby improving the cutting accuracy of the display panel 20 and improving the cutting effect of the display panel 20. Because of the protection of the encapsulation region 104, when cutting to form the display panel 20, the display region of the display panel 20 may not be adversely affected, thereby improving the yield of the display panel 20.

For example, the distance between the outer edge of the first substrate 21 and the encapsulation region 104 may be between 0.1 mm and 1 mm, the distance between the outer edge of the second substrate 22 and the encapsulation region 104 may be between 3.1 mm and 5 mm, and the distance between the outer edge of the third substrate 23 and the encapsulation region 104 may be between 5.1 mm and 8 mm.

For example, as illustrated in FIG. 3, the display panel 20 further includes a first liquid crystal layer 211 and a second liquid crystal layer 212. The first liquid crystal layer 211 is located between the first substrate 21 and the second substrate 22, and the second liquid crystal layer 212 is located between the second substrate 22 and the third substrate 23. The second substrate 22 is a common substrate, and a side of the common substrate (i.e., the second substrate 22) facing the first substrate 21 is provided with a display array element 220. The first substrate 21 is a color filter substrate, and a color filter layer 230 is provided on a side of the first substrate 21 facing the common substrate. The third substrate 23 is a light control array substrate, and a light control array element 240 is provided on a side of the third substrate 23 facing the common substrate.

For example, as illustrated in FIG. 3, the display panel 20 further includes a first polarization structure 251 and a second polarization structure 252. For example, the first polarization structure 251 is located between the second substrate 22 and the second liquid crystal layer 212, and the second polarization structure 252 is located on a side of the third substrate 23 away from the second substrate 22.

It should be noted that in some other embodiments of the present disclosure, according to actual types or requirements of the display panel 20, the first polarization structure 251 and the second polarization structure 252 may also be arranged at other suitable positions, or the display panel 20 may also include other polarization structures, and the embodiments of the present disclosure are not limited in this aspect.

For example, the first polarization structure 251 and the second polarization structure 252 may include transmission polarizers, metal wire grid polarizers, etc., and the embodiments of the present disclosure are not limited in this aspect.

For example, the first polarization structure 251 and the second polarization structure 252 may further include protective layers covering surfaces of the polarizers to protect the polarizers. For example, the protective layer can prevent the polarizer from being damaged, thereby prolonging the service life of the polarizer. For example, a material of the protective layer may be silicon oxide, silicon nitride, or the like, and a thickness of the protective layer may be greater than or equal to 4500 angstroms to form a dense protective layer, thereby achieving a better water-and-oxygen barrier effect.

It should be noted that in the embodiment illustrated in FIG. 3, the display panel 20 including a liquid crystal display structure and a light control display structure is taken as an example for description. In some other embodiments of the present disclosure, the display panel 20 may also be a display panel including other structures or a display panel of other types, and the embodiments of the present disclosure do not limit the specific functions or types of the display panel 20.

For example, the first substrate 21, the second substrate 22, and the third substrate 23 (for example, the first mother substrate 11, the second mother substrate 12, and the third mother substrate 13) may all be glass substrates, quartz substrates, etc., or may also be flexible substrates, such as polyimide substrates, for preparation of flexible display panels.

It should be noted that the display panel motherboard 10 illustrated in FIG. 1 and the display panel 20 illustrated in FIG. 3 may also include other structures or film layers, and the embodiments of the present disclosure are not limited in this aspect.

It should be noted that the specific structures of display regions of the display panel motherboard 10 illustrated in FIG. 1 and the display panel 20 illustrated in FIG. 3 may refer to conventional design solutions in the art, and the embodiments of the present disclosure are not limited in this aspect.

For example, in the embodiment illustrated in FIG. 3, the first substrate 21, the second substrate 22, and the film layer located between the first substrate 21 and the second substrate 22 may be configured to be a liquid crystal display panel, which may include, for example, a gate line, a data line, a pixel electrode, a common electrode, a liquid crystal layer, a color filter, and other display components for displaying. For example, the liquid crystal display panel may be of various types, for example, a vertical electric field type or a horizontal electric field type. For example, the horizontal electric field type may include an in-plane switching (IPS) type, a fringe field switching (FFS) type, an advanced ultra-dimensional switching (ADS) type, or the like, and the embodiments of the present disclosure are not limited in this aspect.

For example, the second substrate 22, the third substrate 23, and the film layer located between the second substrate 22 and the third substrate 23 may be configured to be a light control liquid crystal panel, which may include, for example, a gate line, a data line, a pixel electrode, a common electrode, a liquid crystal layer, and other light control components. For example, the light control liquid crystal panel may be of various types, for example, a vertical electric field type or a horizontal electric field type. For example, the horizontal electric field type may include an in-plane switching (IPS) type, a fringe field switching (FFS)

type, an advanced ultra-dimensional switching (ADS) type, or the like, and the embodiments of the present disclosure are not limited in this aspect.

At least one embodiment of the present disclosure further provides a cutting method of the display panel motherboard according to any one of the embodiments described above. The cutting method includes: cutting the display panel motherboard along at least one cutting line in the cutting region to form at least one display panel, the display panel corresponding to the display panel unit.

For example, in some embodiments of the present disclosure, in the cutting method, cutting the display panel motherboard along the at least one cutting line in the cutting region to form the at least one display panel may include the following steps.

Step S10: cutting the display panel motherboard with an energy cutting beam along a first cutting line in the cutting region, to allow at least one portion to be processed to be separated from the display panel motherboard. Each of the at least one portion to be processed includes one display panel unit.

In some embodiments, the energy cutting beam may be a laser, an electron beam, an ion beam, or the like.

Step S20: mechanically cutting at least one mother substrate of the portion to be processed along a second cutting line, to form the display panel, on a side of the portion to be processed where the bonding region is located.

In some embodiments, the second cutting line includes at least two sub-cutting lines. In a plane parallel to a main surface of the display panel motherboard, a distance between two adjacent sub-cutting lines of the at least two sub-cutting lines is 3 mm to 4 mm.

It should be noted that in the embodiments of the present disclosure, an arrangement direction of the at least three mother substrates is perpendicular to the main surface of the display panel motherboard. For example, the main surface of the display panel motherboard may refer to a main processed surface of the display panel motherboard.

In some embodiments, mechanically cutting includes cutting with a cutting wheel. The second cutting line includes at least two sub-cutting lines, and in a plane parallel to a main surface of the display panel motherboard, a distance between two adjacent sub-cutting lines of the at least two sub-cutting lines is greater than or equal to ½ of a width of the cutting wheel.

For example, the at least three mother substrates may include the first mother substrate, the second mother substrate, and the third mother substrate.

In the following, the cutting method of the display panel motherboard provided by the embodiments of the present disclosure is described by taking the case of cutting the display panel motherboard 10 illustrated in FIG. 1 to form the display panel 20 illustrated in FIG. 3 as an example.

FIG. 4A to FIG. 4D are schematic diagrams of a cutting method of a display panel motherboard provided by some embodiments of the present disclosure. The cutting method includes the following steps.

Step S110: cutting the display panel motherboard 10 by using the energy cutting beam along the first cutting line L10 in the cutting region 102, to allow one portion to be processed 30 to be separated from the display panel motherboard 10. For example, each of one portion to be processed 30 includes one display panel unit 101.

Figure 4A:
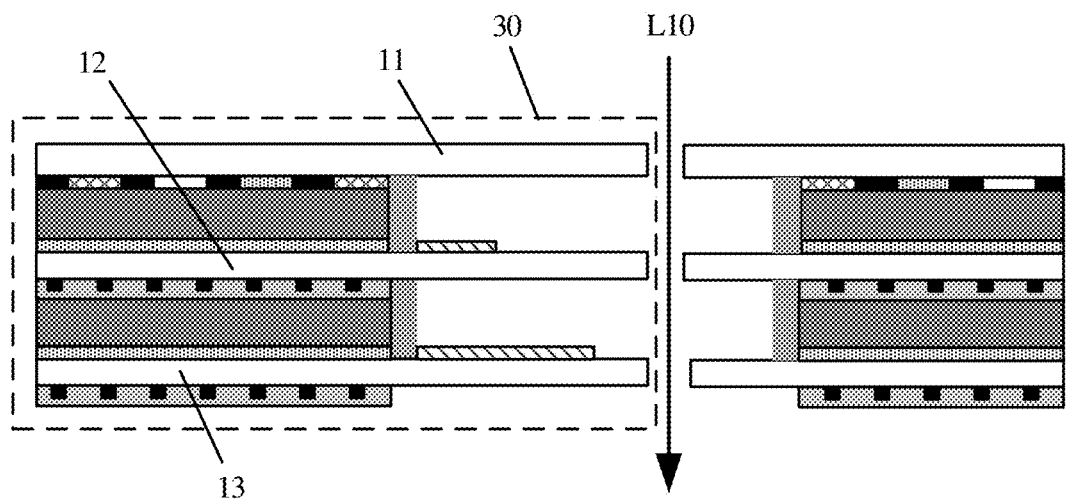
FIG. 4A to FIG. 4D are schematic diagrams of a cutting method of a display panel motherboard provided by some embodiments of the present disclosure.

For example, as illustrated in FIG. 1 and FIG. 4A, the energy cutting beam is used to cut the first mother substrate 11, the second mother substrate 12, and the third mother substrate 13 along the first cutting line L10 at the same time, so as to allow the portion to be processed 30 to be separated from the display panel motherboard 10. For example, the portion to be processed 30 includes one display panel unit 101 for forming the display panel 20 illustrated in FIG. 3.

For example, the energy cutting beam may be a laser, an electron beam, an ion beam, or the like.

For example, in the case where the display panel 20 is a rectangular display panel, there may be four first cutting lines L10. For example, the cutting method may be performed corresponding to four sides of the rectangular display panel, so that the portion to be processed 30 may be separated from the display panel motherboard 10. For the display panel unit 101 located in such as an edge region of the display panel motherboard 10, the number of first cutting lines L10 may be reduced, for example, to two or the like, as long as the number of first cutting lines L10 can meet the requirements for separating the portion to be processed 30 from the display panel motherboard 10, and the embodiments of the present disclosure are not limited in this aspect.

Figure 4B:
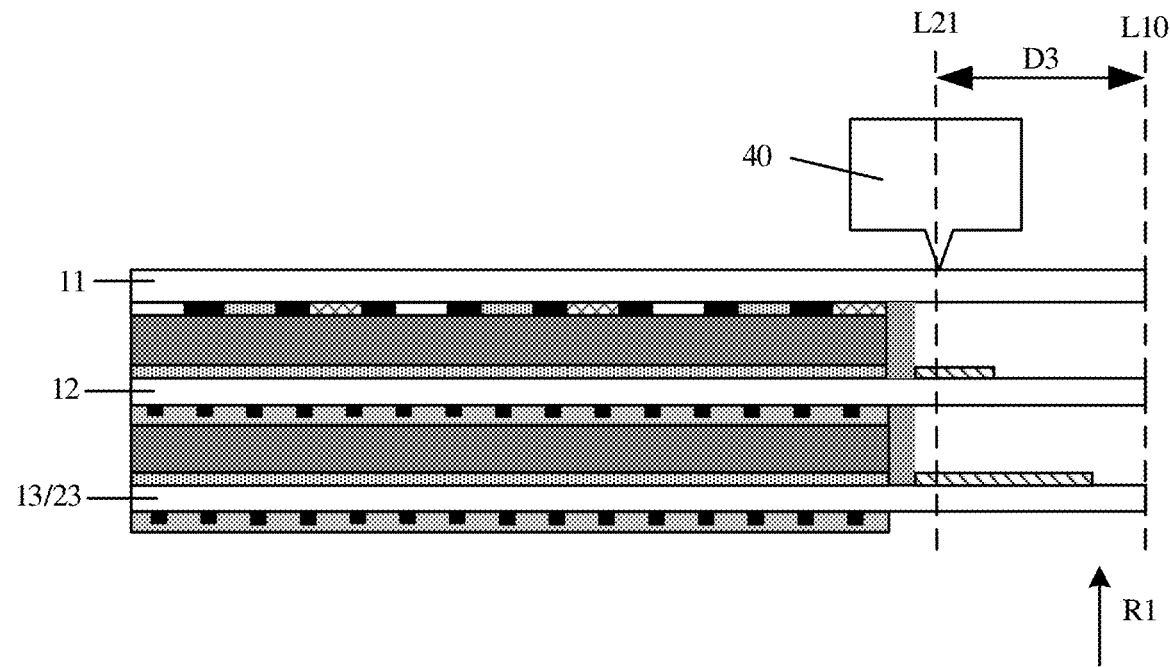
Figure 4C:
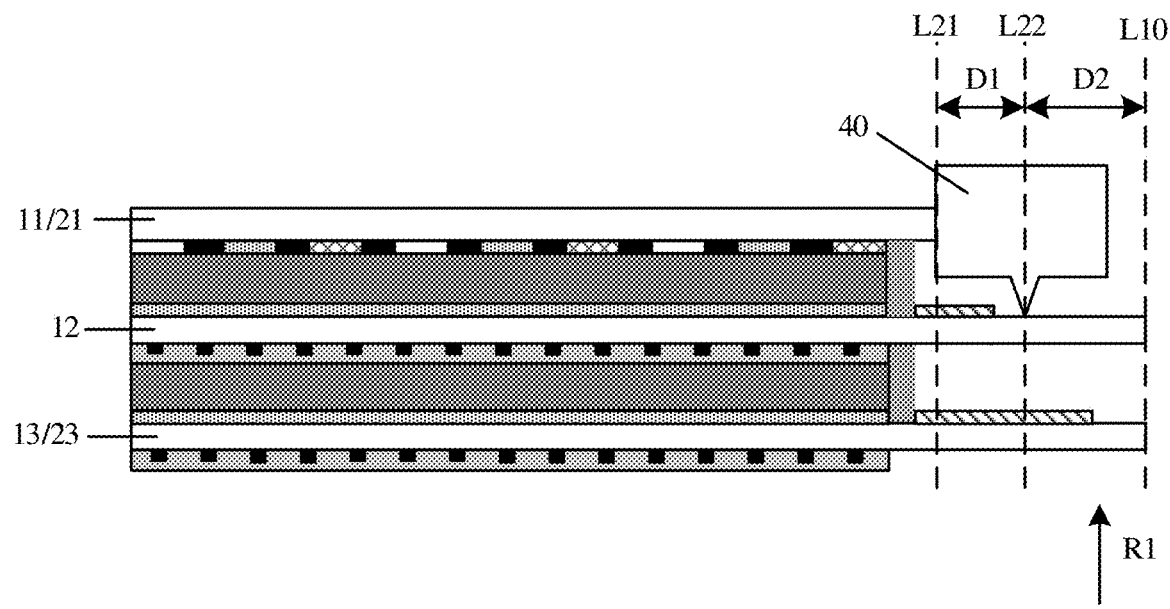

For example, the second cutting line may include the first sub-cutting line L21 and the second sub-cutting line L22 illustrated in FIG. 4B and FIG. 4C.

For example, mechanically cutting the at least one mother substrate of the portion to be processed along the second cutting line to form the display panel may include the following steps.

Step S120: mechanically cutting the first mother substrate 11 of the portion to be processed 30 along the first sub-cutting line L21 (that is, one of the second cutting lines) to form the first substrate 21 of the display panel 20.

For example, as illustrated in FIG. 4B and FIG. 4C, in the plane parallel to the main surface of the display panel motherboard 10, a distance D3 between the first sub-cutting line L21 and the first cutting line L10 is 6 mm to 8 mm.

For example, in the embodiment, the mechanical cutting is cutting with the cutting wheel, that is, cutting the first mother substrate 11 with the cutting wheel 40 along the first sub-cutting line L21 to form the first substrate 21.

Step S130: mechanically cutting the second mother substrate 12 of the portion to be processed 30 along the second sub-cutting line L22 (that is, one of the second cutting lines) to form the second substrate 22 of the display panel 20.

For example, in this embodiment, the mechanical cutting is cutting with the cutting wheel, that is, cutting the second mother substrate 12 with the cutting wheel 40 along the second sub-cutting line L22 to form the second substrate 22.

Figure 4D:
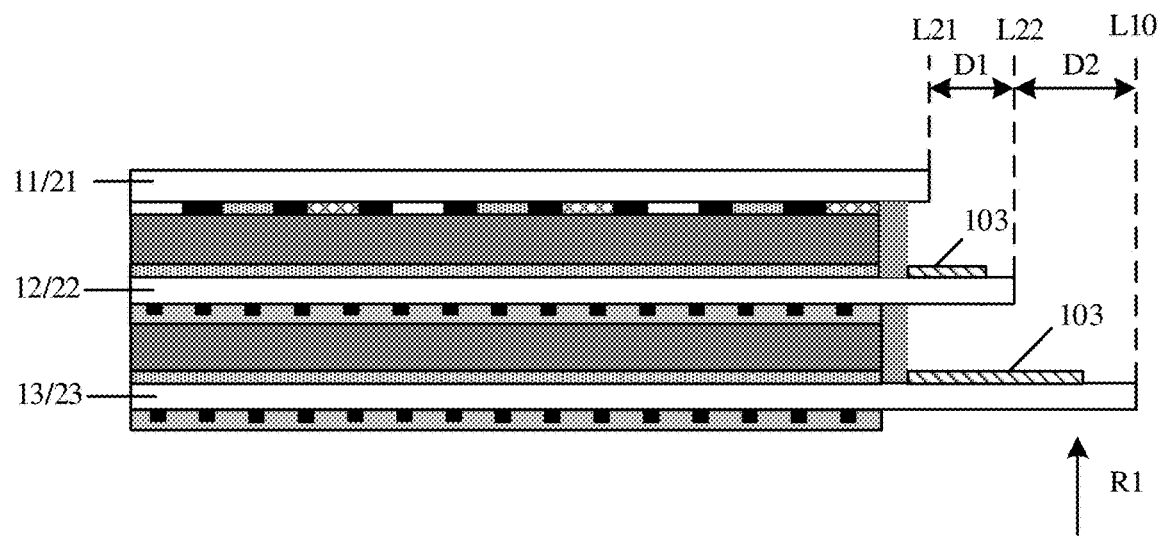

For example, as illustrated in FIG. 4C and FIG. 4D, the first sub-cutting line L21 is located on a side of the second sub-cutting line L22 away from the first cutting line L10.

For example, in a plane parallel to the main surface of the display panel motherboard 10, a distance D1 between the first sub-cutting line L21 and the second sub-cutting line L22 is 3 mm to 4 mm.

For example, in the plane parallel to the main surface of the display panel motherboard 10, a distance D2 between the second sub-cutting line L22 and the first cutting line L10 is 3 mm to 4 mm.

For example, as illustrated in FIG. 4C and FIG. 4D, in the case where the mechanical cutting is cutting with the cutting wheel, in the plane parallel to the main surface of the display panel motherboard 10, a distance between the first sub-cutting line L21 and the second sub-cutting line L22 is greater than or equal to, that is, not less than, ½ of the width of the cutting wheel 40. Therefore, it can be ensured that when the cutting wheel 40 is used to cut the first mother substrate 11 and the second mother substrate 12 to allow the first substrate 21, the second substrate 22, and the third substrate 23 of the display panel 20 to form the stepped structure on a side where the bonding region 103 is located, enough processing space is provided for the cutting wheel 40, so that the cutting wheel 40 can cut smoothly to form the stepped structure of the display panel 20 illustrated in FIG. 4D.

In some embodiments, on the side where the bonding region is located, in the case where the display panel to be prepared includes a structure that the outer edge of the first substrate is on the inner side of the outer edge of the second substrate and the outer edge of the third substrate is on the inner side of the outer edge of the second substrate, the first mother substrate and the third mother substrate may be respectively cut with the cutting wheel to form the desired structure after the portion to be processed is separated from the display panel motherboard by using, for example, a laser.

In some embodiments, when preparing a display panel including four substrates, that is, when cutting a display panel motherboard including four mother substrates, each mother substrate may be cut by using the cutting wheel to form the desired structure after the four mother substrates are cut by using such as the laser to allow the portion to be processed to be separated from the display panel motherboard. For example, taking the display panel motherboard 50 illustrated in FIG. 2 as an example, after the first mother substrate 51, the second mother substrate 52, the third mother substrate 53, and the fourth mother substrate 54 are cut by using such as the laser to allow the portion to be processed to be separated from the display panel motherboard 50, the first mother substrate 51, the second mother substrate 52, and the fourth mother substrate 54 are respectively cut by using the cutting wheel to form the desired structure, for example, a stepped structure. The specific cutting method may refer to the cutting method of the display panel motherboard 10 illustrated in FIG. 4A to FIG. 4D, and details are not described herein again.

In some embodiments, when preparing a display panel including more than four substrates, that is, when cutting a display panel motherboard including more than four mother substrates, each substrate may be cut with the cutting wheel to form the desired structure after the more than four mother substrates are cut with such as the laser to allow the portion to be processed to be separated from the display panel motherboard. The specific cutting method may refer to the cutting method illustrated in FIG. 4A to FIG. 4D, and details are not described herein again.

The specific descriptions and effects of the cutting method of the display panel motherboard provided by the embodiments of the present disclosure may refer to the corresponding descriptions of the display panel motherboard and the display panel provided by the embodiments of the present disclosure, and for example, may refer to the corresponding contents in the embodiments of the display panel motherboard 10, the display panel motherboard 50, and the display panel 20 described above, and details are not described herein again.

At least one embodiment of the present disclosure further provides a manufacturing method of a display panel motherboard, and the manufacturing method includes: forming a display panel motherboard including at least one display panel unit. The display panel motherboard includes: at least three mother substrates stacked with each other, at least one display panel unit, and a cutting region, and the cutting region surrounds at least a portion of the at least one display panel unit. In the cutting region, at least two of the at least three mother substrates are not provided with organic film layers. Forming the display panel motherboard including the at least one display panel unit includes: forming each of the at least three mother substrates, respectively, and assembling the at least three mother substrates to form the display panel motherboard. The step of forming the each of the at least three mother substrates, respectively, includes: etching and removing organic film layers of the at least two of the at least three mother substrates in the cutting region.

For example, in the manufacturing method of the display panel motherboard provided by some embodiments of the present disclosure, in each of the at least one display panel unit, at least one of the at least three mother substrates includes a bonding region. On a mother substrate being not provided with an organic film layer in the cutting region and including the bonding region, the bonding region is not provided with the organic film layer. The step of forming the each of the at least three mother substrates, respectively, further includes: etching and removing the organic film layer in the bonding region of the mother substrate being not provided with the organic film layer in the cutting region and including the bonding region.

Hereinafter, the preparation of the film layer on the mother substrate in the manufacturing method of the display panel motherboard provided by some embodiments of the present disclosure is described by taking the second mother substrate 12 of the display panel motherboard 10 illustrated in FIG. 1 as an example.

In some embodiments, the step of forming each of the at least three mother substrates, respectively, further includes: etching and removing the organic film layer in the bonding region of the mother substrate being not provided with the organic film layer in the cutting region and including the bonding region.

In some embodiments, the step of forming each of the at least three mother substrates, respectively, further includes: etching and removing the inorganic film layer in the bonding region of the mother substrate being not provided with the inorganic film layer in the cutting region and including the bonding region.

FIG. 5A to FIG. 5I are schematic diagrams of a method for manufacturing a film layer on a mother substrate of a display panel motherboard provided by some embodiments of the present disclosure. In the embodiment illustrated in FIG. 5A to FIG. 5I, etching and removing the organic film layer and the inorganic film layer in the bonding region 103 and the cutting region 102 of the second mother substrate 12 is taken as an example for description. For example, the manufacturing method may include the following steps.

Step S210: providing the second mother substrate 12.

Figure 5A:
FIG. 5A to FIG. 5I are schematic diagrams of a method for manufacturing film layers on a mother substrate of a display panel motherboard provided by some embodiments of the present disclosure.

For example, as illustrated in FIG. 5A, the second mother substrate 12 may be a glass substrate, a quartz substrate, a plastic substrate, or the like.

Step S220: forming a gate electrode 281, a power line 282, and a bonding line 283 on the second mother substrate 12.

Figure 5B:
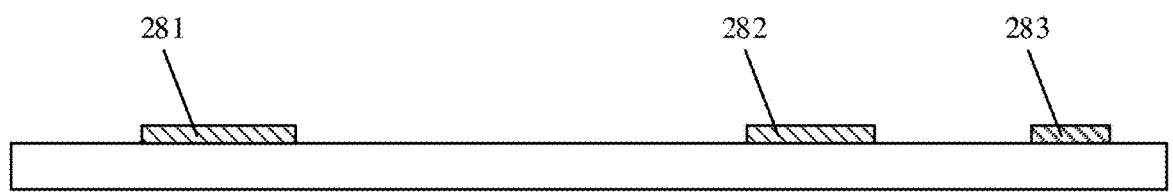

For example, as illustrated in FIG. 5B, a conductive thin film (such as a metal thin film) may be formed on the second mother substrate 12 by deposition or the like, and then the gate electrode 281, the power line 282, and the bonding line 283 may be formed by a patterning method (such as a photolithography method). For example, the gate electrode 281, the power line 282, and the bonding line 283 may be the metal molybdenum or molybdenum alloy, the metal aluminum or aluminum alloy, the metal copper or copper alloy, or the like.

Step S230: forming a gate insulating layer 291 on the gate electrode 281, the power line 282, and the bonding line 283, and etching and removing the gate insulating layer 291 in the bonding region 103 and the cutting region 102, that is, etching and removing the organic film layer or the inorganic film layer in the bonding region 103 and the cutting region 102.

Figure 5C:
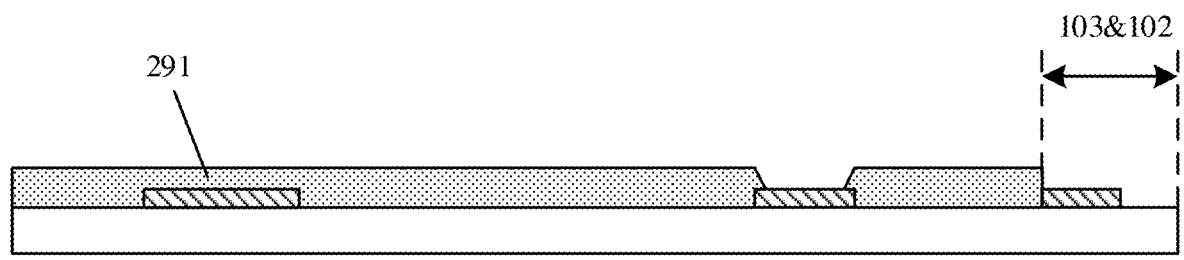

For example, as illustrated in FIG. 5C, the gate insulating layer 291 may be formed by a method such as physical vapor deposition, chemical vapor deposition, coating, or the like, and the gate insulating layer 291 may be an inorganic insulating layer or an organic insulating layer.

Step S240: forming an active layer 284 on the gate insulating layer 291.

Figure 5D:

For example, as illustrated in FIG. 5D, the active layer 284 may be amorphous silicon, poly-silicon, oxide semiconductors, etc., and may be patterned by, for example, the photolithography process.

Step S250: forming a source electrode 285 and a drain electrode 286 of a transistor on the active layer 284.

Figure 5E:

For example, as illustrated in FIG. 5E, the source electrode 285 and the drain electrode 286 of the transistor are connected to a source region and a drain region of the active layer 284, respectively.

Step S260: forming a first insulating layer 292 and a second insulating layer 293 on the source electrode 285 and the drain electrode 286 of the transistor, and etching and removing the first insulating layer 292 and the second insulating layer 293 in the bonding region 103 and the cutting region 102, that is, etching and removing the organic film layer or the inorganic film layer in the bonding region 103 and the cutting region 102.

Figure 5F:
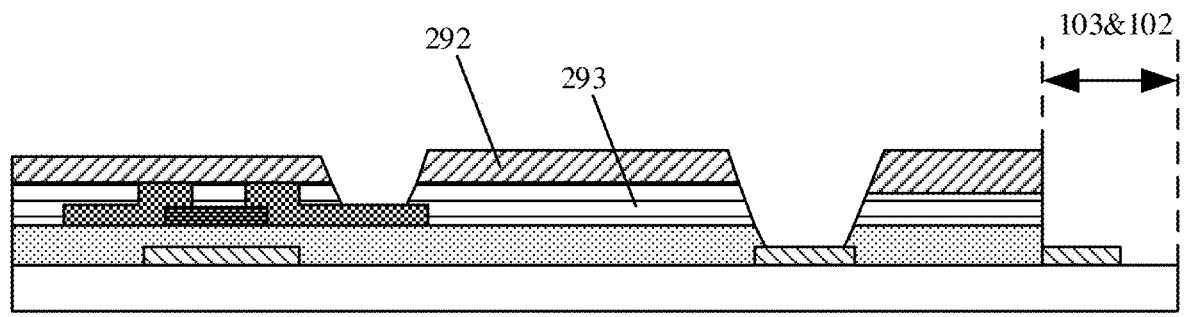

For example, as illustrated in FIG. 5F, the first insulating layer 292 and the second insulating layer 293 may be formed by physical vapor deposition, chemical vapor deposition, coating, or the like, and the first insulating layer 292 and the second insulating layer 293 may be an inorganic insulating layer or an organic insulating layer.

Step S270 manufacturing a first conductive film layer 287 on the first insulating layer 292 and the second insulating layer 293.

Figure 5G:
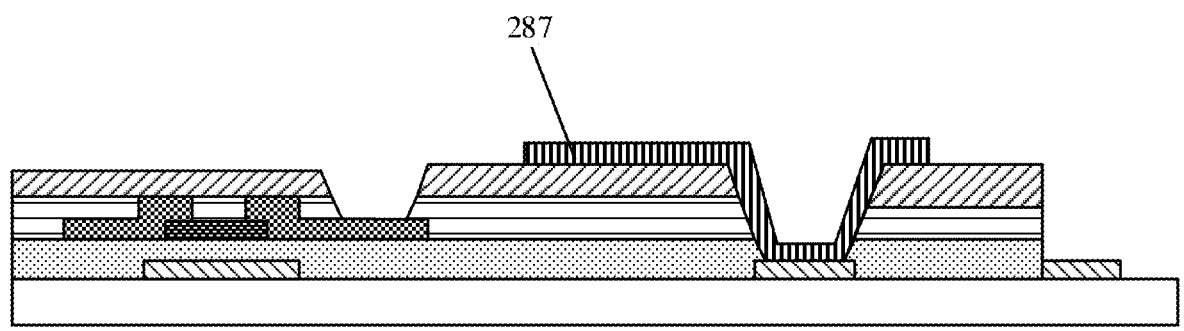

For example, as illustrated in FIG. 5G, a material of the first conductive film layer 287 may be a conductive material such as indium tin oxide.

Step S280 manufacturing a third insulating layer 294 on the first conductive film layer 287, and etching and removing the third insulating layer 294 in the bonding region 103 and the cutting region 102, that is, etching and removing the organic film layer or the inorganic film layer in the bonding region 103 and the cutting region 102.

Figure 5H:
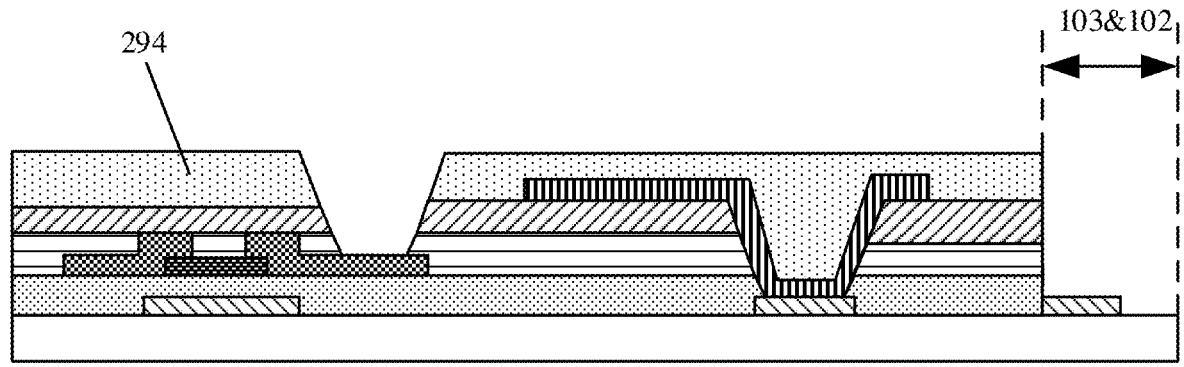

For example, as illustrated in FIG. 5H, the third insulating layer 294 may be formed by a method such as physical vapor deposition, chemical vapor deposition, coating, or the like, and the third insulating layer 294 may be an inorganic insulating layer or an organic insulating layer.

Step S290: manufacturing a second conductive film layer 288 on the third insulating layer 294.

Figure 5I:
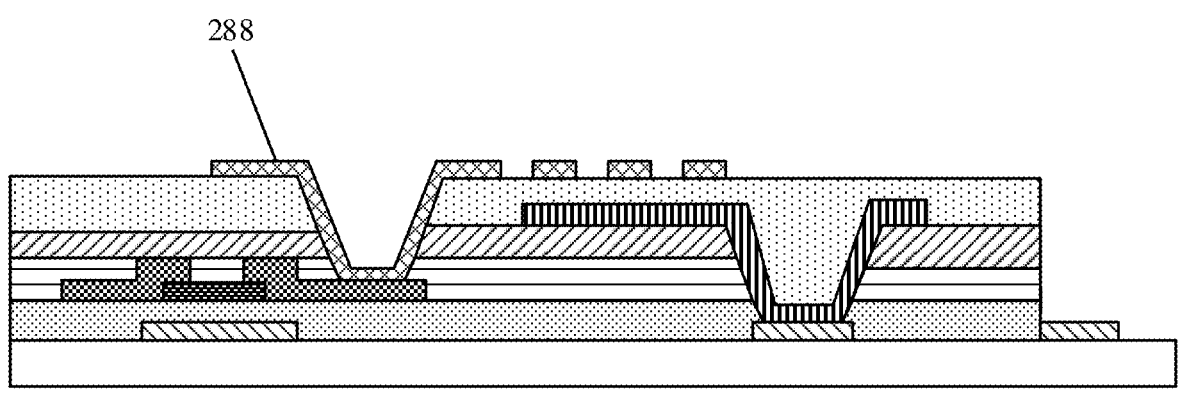

For example, as illustrated in FIG. 5I, a material of the second conductive film layer 288 may be a conductive material such as indium tin oxide.

It should be noted that other structural layers or functional layers may also be provided on the second mother substrate 12, and the embodiments of the present disclosure are not limited in this aspect.

The specific descriptions and effects of the manufacturing method of the display panel motherboard provided by the embodiments of the present disclosure may refer to the corresponding descriptions of the display panel motherboard and the display panel provided by the embodiments of the present disclosure, and for example, may refer to the corresponding contents in the embodiments of the display panel motherboard 10, the display panel motherboard 50, and the display panel 20 described above, and details are not described herein again.

At least one embodiment of the present disclosure further provides a display device, and the display device includes the display panel according to any one of the embodiments of the present disclosure, and for example, includes the display panel 20 in the embodiments described above.

The specific descriptions and effects of the display device provided by the embodiments of the present disclosure may be with reference to the corresponding descriptions of the display panel provided by the embodiments of the present disclosure, and for example, may be with reference to the corresponding contents in the embodiments of the display panel 20 described above, and details are not described herein again.

For example, the display device provided by the embodiments of the present disclosure may be a liquid crystal display device, or may also be a device of other types with a display function, and the embodiments of the present disclosure are not limited in this aspect.

For example, the display device provided by the embodiments of the present disclosure may be any product or component with the display function, such as a display substrate, a display panel, an electronic paper, a mobile phone, a tablet computer, a television, a monitor, a notebook computer, a digital photo frame, a navigator, etc., and the embodiments of the present disclosure are not limited in this aspect.

The following statements need to be noted.

(1) The drawings of the embodiments of the present disclosure involve only the structures related to the embodiments of the present disclosure, and other structures may be referred to general design.

(2) For the sake of clarity, in the drawings used to describe the embodiments of the present disclosure, the thickness of a layer or area is enlarged or reduced, that is, these drawings are not drawn to actual scale. It is understood that when an element such as a layer, film, region, or substrate is referred to as being "on" or "under" another element, it can be "directly" on the other element, or there may be intermediate elements.

(3) In case of no conflict, the embodiments of the present disclosure and the features in the embodiments can be combined with each other to obtain new embodiments.

What have been described above merely are specific implementations of the present disclosure, but the protection scope of the present disclosure is not limited to this. Any person skilled in the art can easily think of changes or replacements within the technical scope disclosed in the present disclosure, which should be covered within the protection scope of the present disclosure. Therefore, the protection scope of the present disclosure is determined by the appended claims.

What is claimed is:

1. A display panel, obtained by cutting a display panel motherboard, wherein the display panel motherboard comprises at least three mother substrates, at least one display panel unit, and a cutting region;

the at least three mother substrates are laminated with each other, at least a portion of the at least one display panel unit is surrounded by the cutting region, and an organic film layer is not disposed in at least two of the at least three mother substrates in the cutting region;

the display panel comprises at least three substrates;

each of the at least three substrates is obtained by cutting each of the at least three mother substrates;

at least one of the at least three substrates comprises a bonding region, and one of the at least one display panel unit corresponds to the display panel;

on a side where the bonding region is located, orthographic projections of outer edges of the at least three substrates in a plane parallel to a main surface of the display panel do not overlap with each other;

on the side where the bonding region is located, the outer edges of the at least three substrates are in a stepped structure along a first direction, and the first direction is perpendicular to the main surface of the display panel; and on the side where the bonding region is located, among the orthographic projections of the outer edges of the at least three substrates in the plane parallel to the main surface of the display panel except for an outermost orthographic projection, a distance between adjacent orthographic projections is greater than or equal to 1/2 of a width of a cutting wheel used for cutting the display panel motherboard.

2. The display panel according to claim 1, wherein the at least three substrates comprise a first substrate, a second substrate, and a third substrate;

the first substrate is on a side of the second substrate away from the third substrate; and on the side where the bonding region is located, an orthographic projection of an outer edge of the first substrate on the second substrate is on an inner side of an outer edge of the second substrate, and an orthographic projection of the outer edge of the second substrate on the third substrate is on an inner side of an outer edge of the third substrate.

3. The display panel according to claim 2, further comprising:

a first liquid crystal layer, being between the first substrate and the second substrate; and a second liquid crystal layer, being between the second substrate and the third substrate, wherein the second substrate is a common substrate, and a display array element is provided on a side of the common substrate facing the first substrate;

the first substrate is a color filter substrate, and a color filter layer is provided on a side of the first substrate facing the common substrate; and the third substrate is a light control array substrate, and a light control array element is provided on a side of the third substrate facing the common substrate.

4. The display panel according to claim 1, wherein an inorganic film layer is not disposed in the bonding region of at least one of the at least three substrates.

5. The display panel according to claim 1, wherein each of the at least three substrates further comprises an encapsulation region;

in a substrate comprising the bonding region, at least a portion of the encapsulation region is surrounded by the bonding region; and on a side where the bonding region is located, a gap is provided between an outer edge of each of the at least three substrates and the bonding region, or between the outer edge of each of the at least three substrates and the encapsulation region.

6. A display device, comprising the display panel according to claim 1.

7. A cutting method of a display panel motherboard, wherein the display panel motherboard comprises at least three mother substrates, at least one display panel unit, and a cutting region, the at least three mother substrates are laminated with each other, at least a portion of the at least one display panel unit is surrounded by the cutting region, and an organic film layer is not disposed in at least two of the at least three mother substrates in the cutting region; and the cutting method comprises:
cutting the display panel motherboard along at least one cutting line in the cutting region to form at least one display panel,
wherein the display panel corresponds to the display panel unit;

the cutting the display panel motherboard along the at least one cutting line in the cutting region to form the at least one display panel comprises: cutting the display panel motherboard with an energy cutting beam along a first cutting line in the cutting region, to allow at least one portion to be processed to be separated from the display panel motherboard, wherein each of the at least one portion to be processed comprises one display panel unit;

the cutting the display panel motherboard along the at least one cutting line in the cutting region to form the at least one display panel further comprises: mechanically cutting at least one mother substrate of the portion to be processed along a second cutting line to form the display panel on a side of the portion to be processed where a bonding region is located;

wherein the at least three mother substrates comprise a first mother substrate, a second mother substrate, and a third mother substrate; and the mechanically cutting the at least one mother substrate of the portion to be processed along the second cutting line to form the display panel comprises:

mechanically cutting a first mother substrate of the portion to be processed along a first sub-cutting line to form a first substrate of the display panel, and mechanically cutting a second mother substrate of the portion to be processed along a second sub-cutting line to form a second substrate of the display panel, wherein the first sub-cutting line is on a side of the second sub-cutting line away from the first cutting line.

8. The cutting method according to claim 7, wherein in each of the at least one display panel unit, at least one of the at least three mother substrates comprises a bonding region; and on a mother substrate in which an organic film layer is not disposed in the cutting region and comprising the bonding region, the organic film layer is not disposed in the bonding region.

9. The cutting method according to claim 7, wherein an inorganic film layer is not disposed in the cutting region of at least one of the at least three mother substrates.

10. The cutting method according to claim 7, wherein the energy cutting beam comprises a laser, an electron beam, or an ion beam.

11. The cutting method according to claim 7, wherein the mechanically cutting comprises cutting with a cutting wheel;

the second cutting line comprises at least two sub-cutting lines; and in a plane parallel to a main surface of the display panel motherboard, a distance between two adjacent sub-cutting lines of the at least two sub-cutting lines is greater than or equal to ½ of a width of the cutting wheel.

12. A manufacturing method of a display panel motherboard, comprising:

forming a display panel motherboard comprising at least one display panel unit, wherein the display panel motherboard comprises:

at least three mother substrates stacked with each other;

the at least one display panel unit; and a cutting region, at least a portion of the at least one display panel unit being surrounded by the cutting region, wherein an organic film layer is not disposed in at least two of the at least three mother substrates in the cutting region;

the forming the display panel motherboard comprising the at least one display panel unit comprises:

forming each of the at least three mother substrates, respectively, and assembling the at least three mother substrates to form the display panel motherboard, wherein a step of forming the each of the at least three mother substrates, respectively, comprises: etching and removing organic film layers of the at least two of the at least three mother substrates in the cutting region;

wherein in each of the at least one display panel unit, at least one of the at least three mother substrates comprises a bonding region;

on a mother substrate in which an organic film layer is not disposed in the cutting region and comprising the bonding region, the organic film layer is not disposed in the bonding region; and the step of forming the each of the at least three mother substrates, respectively, further comprises:

etching and removing the organic film layer in the bonding region of the mother substrate in which an organic film layer is not disposed in the cutting region and comprising the bonding region.

* * * * *